United States Patent
Fait et al.

(10) Patent No.: US 7,569,648 B2
(45) Date of Patent: Aug. 4, 2009

(54) PROCESS FOR THE COPOLYMERIZATION OF ETHYLENE

(75) Inventors: Anna Fait, Ferrara (IT); Alexander Koeppl, Limburgerhof (DE); Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/504,251

(22) PCT Filed: Feb. 10, 2003

(86) PCT No.: PCT/EP03/01296

§ 371 (c)(1),
(2), (4) Date: Aug. 10, 2004

(87) PCT Pub. No.: WO03/070778

PCT Pub. Date: Aug. 28, 2003

(65) Prior Publication Data

US 2005/0222349 A1 Oct. 6, 2005

(30) Foreign Application Priority Data

Feb. 25, 2002 (EP) .................................. 02075757

(51) Int. Cl.
*C08F 4/64* (2006.01)
*C08F 4/72* (2006.01)
(52) U.S. Cl. .................. 526/161; 526/172; 526/352; 526/348.6; 526/348.5; 526/348.2
(58) Field of Classification Search ............... 526/170, 526/160, 126, 943, 171, 161, 348.6, 172; 556/53
See application file for complete search history.

(56) References Cited

U.S. PATENT DOCUMENTS

| | | | |
|---|---|---|---|
| 5,698,487 A | 12/1997 | Sacchetti et al. | 502/117 |
| 6,399,533 B2 | 6/2002 | Sacchetti et al. | 502/125 |
| 6,423,660 B1 | 7/2002 | Albizzati et al. | 502/109 |
| 6,444,604 B1 | 9/2002 | Albizzati et al. | 502/109 |
| 6,559,252 B1 | 5/2003 | Horton et al. | 526/160 |
| 6,608,224 B2 | 8/2003 | Resconi et al. | 556/27 |
| 6,627,710 B1 | 9/2003 | Sacchetti et al. | 526/112 |
| 6,774,194 B2 | 8/2004 | Albizzati et al. | 526/160 |
| 6,787,619 B2 | 9/2004 | Dall'Occo et al. | 526/161 |
| 6,822,106 B2 | 11/2004 | Dall'Occo et al. | 556/53 |
| 6,841,501 B2 | 1/2005 | Resconi et al. | 502/117 |
| 6,864,333 B2 | 3/2005 | Dall'Occo et al. | 526/161 |
| 6,878,786 B2 | 4/2005 | Resconi et al. | 526/127 |
| 6,953,829 B2 | 10/2005 | Kratzer et al. | 526/160 |
| 7,002,031 B2 | 2/2006 | Resconi et al. | 556/11 |
| 7,041,750 B1 | 5/2006 | Covezzi et al. | 526/68 |
| 7,101,940 B2 | 9/2006 | Schottek et al. | 526/134 |
| 7,112,638 B2 | 9/2006 | Nifant'ev et al. | 526/160 |
| 7,141,527 B1 | 11/2006 | Van Baar et al. | 502/104 |
| 2003/0008984 A1 | 1/2003 | Kratzer et al. | 526/127 |
| 2003/0013913 A1 | 1/2003 | Schottek et al. | 564/8 |
| 2006/0235173 A1 | 10/2006 | Resconi | 526/127 |

FOREIGN PATENT DOCUMENTS

| | | |
|---|---|---|
| DE | 19962814 | 6/2001 |
| DE | 19962910 | 7/2001 |
| EP | 0633272 | 1/1995 |
| EP | 1173445 | 1/2002 |
| WO | 9102012 | 2/1991 |
| WO | 9200333 | 1/1992 |
| WO | 9532995 | 12/1995 |
| WO | 9921899 | 5/1999 |
| WO | 0078820 | 12/2000 |
| WO | 0121674 | 3/2001 |
| WO | 0144319 | 6/2001 |
| WO | 0147939 | 7/2001 |
| WO | 0148039 | 7/2001 |
| WO | 0148040 | 7/2001 |
| WO | WO 01/47939 A1 * | 7/2001 |
| WO | 03/057705 | 7/2003 |
| WO | 2004/099269 | 11/2004 |
| WO | 2005/095468 | 10/2005 |
| WO | 2005/095473 | 10/2005 |
| WO | 2005/095474 | 10/2005 |
| WO | 2006/005648 | 1/2006 |

* cited by examiner

*Primary Examiner*—David Wu
*Assistant Examiner*—Rip A. Lee
(74) *Attorney, Agent, or Firm*—William R Reid

(57) ABSTRACT

A process for producing a polymer of ethylene containing from 0.1 to 50% by weight of one or more derived units of alpha-olefins fo formula $CH_2=CHR$, wherein R is a $C_2$-$C_{20}$ alkyl radical, comprising contacting, under polymerization conditions, ethylene and one or more alpha-olefins in the presence of a catalyst system obtainable by contacting: a) a metallocene compound of formula (I) wherein: M is zirconium titanium or hafminum, X, equal to or different from each other, is hydrogen halogen or an hydrocarbyl radical, $R^1$, $R^2$, $R^3$, $R^4$, $R^5$, $R^6$, $R^7$, $R^8$ and $R^9$, equal to or different from each other are hydrogen atoms, halogen atoms, or hydrocarbyl radicals; and b) an alumoxane or a compound capable of forming an alkyl metallocene cation.

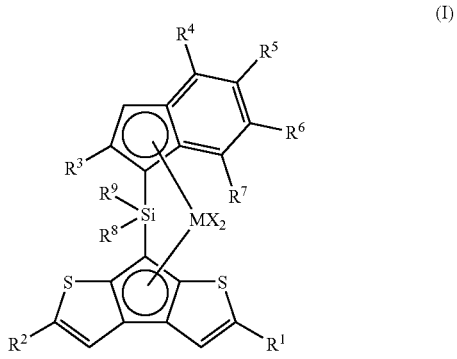

(I)

12 Claims, No Drawings

PROCESS FOR THE COPOLYMERIZATION OF ETHYLENE

This application is the U.S. national phase of International Application PCT/EP03/01296, filed Feb. 10, 2003.

The present invention relates to a process for the polymerization of ethylene and one or more alpha-olefins of formula $CH_2=CHR$, wherein R is a $C_2$-$C_{20}$ alkyl radical, in the presence of a metallocene catalyst.

It is known that polyethylene can be modified by the addition, during the polymerization reaction, of small quantities of alpha-olefins, generally 1-butene, 1-hexene or 1-octene. This gives LLDPE (linear low density polyethylene) copolymers which have short branches along the main chain due to the units derived from the alpha-olefin comonomers. These branches have the effect that the degree of crystallinity and hence the density of copolymer turn out to be lower than in polyethylene homopolymer. Typically, the LLDPE copolymers have densities of the order of 0.915-0.940 g/cm³ Consequently, the LLDPE copolymers have optimum mechanical properties, in particular for the production of films. The lowering of the degree of crystallinity and of the density of the copolymers depends on the type and quantity of the incorporated alpha-olefin. In particular, the greater the quantity of incorporated alpha-olefin, the lower are the resulting degrees of crystallinity and density.

Besides the type and quantity of the incorporated alpha-olefin comonomer, the properties of the copolymer depend on the distribution of the branches along the polymer chain. In particular, a uniform distribution of the branches has a positive effect on the properties of the copolymers. In fact, with the same type and quantity of incorporated alpha-olefin, a higher uniformity of distribution allows lower degrees of crystallinity and density to be obtained.

Metallocene compounds having two bridged cyclopentadienyl groups are known as catalyst components for the homo- and copolymerization reaction of ethylene. For example in WO 01/47939 a particular class of metallocenes containing a dithiophene-cyclopentadienyl ligand is reported and several compounds are exemplified in ethylene/propylene copolymerization. Nevertheless, in these examples the molecular weight of the obtained copolymers (expressed as intrinsic viscosity) is very low and not suitable for industrial use. Moreover, it is well known in the art that propylene is not a good comonomer for preparing LLDPE.

WO 01/48040 relates to a process for the polymerization of ethylene in the presence of a class of metallocenes comprising a ligand formed by a dithiophene-cyclopentadienyl derivative linked through a silicon bridge to a tetrasubstituted cyclopentadienyl radical. In this document ethylene is copolymerized with 1-hexene to give LLDPE. The claimed compounds are completely different from that of the present invention.

WO01/48039 relates to a slightly different class of metallocene compounds in which two cyclopentadienyl moieties are bridged with a methylene group. In this case the ethylene/hexene copolymers obtained show molecular weight values that are not satisfactory for industrial use.

Thus it would be desirable to develop a new process that, by using a particular class of metallocene compounds, allow ethylene copolymers having a high molecular weight to be obtained.

According to a first aspect of the present invention, it is provided a process for producing a polymer of ethylene containing from 0.1 to 50% by weight of one or more derived units of alpha-olefins of formula $CH_2=CHR$, wherein R is a $C_2$-$C_{20}$ alkyl radical, comprising contacting, under polymerization conditions, ethylene and one or more alpha-olefins in the presence of a catalyst system obtainable by contacting:

a) a metallocene compound of formula (I)

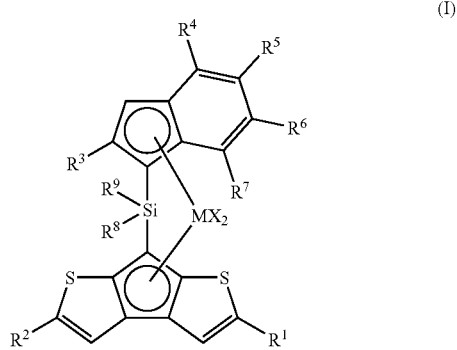

wherein:

M is zirconium, titanium or hafnium; preferably zirconium;

X, equal to or different from each other, are hydrogen atoms, halogen atoms, or a $R^{10}$, $OR^{10}$, $OR^{11}O$, $OSO_2CF_3$, $OCOR^{10}$, $SR^{10}$, $NR^{10}_2$ or $PR^{10}_2$ group, wherein $R^{10}$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a $OR^{11}O$ group wherein $R^{11}$ is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a $R^{10}$ group; more preferably X is chlorine or a methyl radical;

$R^1$, $R^2$, $R^3$, $R^4$, $R^5$, $R^6$, $R^7$, $R^8$ and $R^9$, equal to or different from each other, are hydrogen atoms, halogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; two adjacent $R^4$, $R^5$, $R^6$, $R^7$, $R^8$ and $R^9$ groups can optionally form a saturated or unsaturated, 5 or 6 membered ring; said ring can bear alkyl substituents. For example $R^4$, $R^5$, $R^6$ and $R^7$ may form a condensed benzene ring, a condensed thiophene ring, or a condensed pyrrole ring;

b) an alumoxane or a compound capable of forming an alkyl metallocene cation; and optionally c) an organo aluminum compound.

Preferably in the compound of formula (I):

$R^1$, $R^2$ and $R^3$, equal to or different from each other, are $C_1$-$C_{10}$ alkyl radicals; more preferably $R^1$ and $R^2$ are methyl group and $R^3$ is a methyl or an isopropyl radical;

$R^4$ is preferably hydrogen, a $C_6$-$C_{20}$-aryl radical or form with $R^5$ a condensed aromatic 5 of 6 membered ring such as a condensed benzene ring a condensed thiophene ring or a condensed pyrrole ring;

$R^5$ is preferably a hydrogen atom or form with $R^4$ a condensed 5 or 6 membered aromatic ring;

$R^6$ preferably hydrogen atom; and $R^7$ is preferably hydrogen atom or a methyl radical;

R[8] and R[9] are preferably $C_1$-$C_{10}$ alkyl or $C_6$-$C_{20}$ aryl radicals; more preferably they are methyl radicals.

Compounds of formula (I) can be synthesized according to the procedures known in the art, for example as described in WO 01/47939.

Alumoxanes used as component b) can be obtained by reacting water with an organo-aluminum compound of formula $H_jAlU_{3-j}$ or $H_jAl_2U_{6-j}$, where U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The molar ratio between aluminum and the metal of the metallocene is comprised between about 10:1 and about 10000:1, more preferably between about 50:1 and about 5000:1, even more preferably between 100:1 and 1000:1.

The alumoxanes used in the catalyst according to the invention are considered to be linear, branched or cyclic compounds containing at least one group of the type:

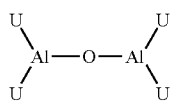

wherein the substituents U, same or different, are described above.

In particular, alumoxanes of the formula:

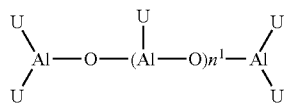

can be used in the case of linear compounds, wherein $n^1$ is 0 or an integer from 1 to 40 and the substituents U are defined as above, or alumoxanes of the formula:

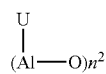

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 obtained by contacting water with organometallic aluminum compounds in which the alkyl and aryl groups have specific branched patterns.

Non-limiting examples of aluminum compounds according to WO 99/21899 and WO01/21674 are:
tris(2,3,3-trimethyl-butyl)aluminum, tris(2,3-dimethyl-hexyl)aluminum, tris(2,3-dimethyl-butyl)aluminum, tris (2,3-dimethyl-pentyl)aluminum, tris(2,3-dimethyl-heptyl) aluminum, tris(2-methyl-3-ethyl-pentyl)aluminum, tris(2-methyl-3-ethyl-hexyl)aluminum, tris(2-methyl-3-ethyl-heptyl)aluminum, tris(2-methyl-3-propyl-hexyl) aluminum, tris(2-ethyl-3-methyl-butyl)aluminum, tris(2-ethyl-3-methyl-pentyl)aluminum, tris(2,3-diethyl-pentyl) aluminum, tris(2-propyl-3-methyl-butyl)aluminum, tris (2-isopropyl-3-methyl-butyl)aluminum, tris(2-isobutyl-3-methyl-pentyl)aluminum, tris(2,3,3-trimethyl-pentyl) aluminum, tris(2,3,3-trimethyl-hexyl)aluminum, tris(2-ethyl-3,3-dimethyl-butyl)aluminum, tris(2-ethyl-3,3-dimethyl-pentyl)aluminum, tris(2-isopropyl-3,3-dimethyl-butyl)aluminum, tris(2-trimethylsilyl-propyl) aluminum, tris(2-methyl-3-phenyl-butyl)aluminum, tris (2-ethyl-3-phenyl-butyl)aluminum, tris(2,3-dimethyl-3-phenyl-butyl)aluminum, tris(2-phenyl-propyl)aluminum, tris[2-(4-fluoro-phenyl)-propyl]aluminum, tris[2-(4-chloro-phenyl)-propyl]aluminum, tris[2-(3-isopropyl-phenyl)-propyl]aluminum, tris(2-phenyl-butyl)aluminum, tris(3-methyl-2-phenyl-butyl)aluminum, tris(2-phenyl-pentyl)aluminum, tris[2-(pentafluorophenyl)-propyl]aluminum, tris[2,2-diphenyl-ethyl]aluminum and tris[2-phenyl-2-methyl-propyl]aluminum, as well as the corresponding compounds wherein one of the hydrocarbyl groups is replaced with a hydrogen atom, and those wherein one or two of the hydrocarbyl groups are replaced with an isobutyl group.

Amongst the above aluminum compounds, trimethylaluminum (TMA), triisobutylaluminum (TIBAL), tris(2,4,4-trimethyl-pentyl)aluminum (TIOA), tris(2,3-dimethylbutyl) aluminum (TDMBA) and tris(2,3,3-trimethylbutyl) aluminum (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to displaced by an olefinic monomer. Preferably, the anion $E^-$ comprises one or more boron atoms. More preferably, the anion $E^-$ is an anion of the formula $BAr_4^{(-)}$, wherein the substituents Ar, which can be identical or different, are aryl radicals such as phenyl, pentafluorophenyl or bis(trifluoromethyl)phenyl. Tetrakis-pentafluorophenyl borate is particularly preferred; examples of these compounds are described in WO 91/02012. Moreover, compounds of the formula $BAr_3$ can be conveniently used. Compounds of this type are described, for example in WO 92/00333. Other examples of compounds able to form an alkylmetallocene cation are compounds of formula $BAr_3P$ wherein P is a substituted or unsubstituted pyrrol radicals. These compounds are described in EP 1173445. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are: Triethylammoniumtetra(phenyl)borate, Tributylammoniumtetra(phenyl)borate, Trimethylammoniumtetra(tolyl)borate, Tributylammoniumtetra(tolyl)borate, Tributylammoniumtetra(pentafluorophenyl)borate, Tributylammoniumtetra (pentafluorophenyl)aluminate, Tripropylammoniumtetra (dimethylphenyl)borate, Tributylammoniumtetra (trifluoromethylphenyl)borate, Tributylammoniumtetra(4- fluorophenyl)borate, N,N-Dimethylbenzylammoniumtetrakispentafluorophenylborate, N,N-Dimethylhexylamonium-tetrakispentafluorophenylborate, N,N-Dimethylaniliniumtetra(phenyl)borate, N,N-Diethylaniliniumtetra(phenyl)borate, N,N-Dimethylaniliniumtetrakis(pentafluorophenyl)borate, N,N-Dimethylaniliniumtetrakis(pentafluorophenyl)aluminate, N,N-Dimethylbenzylammonium-tetrakispentafluorophenylborate, N,N-Dimethylhexylamonium-tetrakispentafluorophenylborate, Di(propyl)ammoniumtetrakis(pentafluorophenyl)borate, Di(cyclohexyl)ammoniumtetrakis(pentafluorophenyl)borate, Triphenylphosphoniumtetrakis(phenyl)borate, Triethylphosphoniumtetrakis(phenyl)borate, Diphenylphosphoniumtetrakis(phenyl)borate, Tri(methylphenyl)phosphoniumtetrakis(phenyl)borate, Tri(dimethylphenyl)phosphoniumtetrakis(phenyl)borate, Triphenylcarbeniumtetrakis(pentafluorophenyl)borate, Triphenylcarbeniumtetrakis(pentafluorophenyl)aluminate, Triphenylcarbeniumtetrakis(phenyl)aluminate, Ferroceniumtetrakis(pentafluorophenyl)borate, Ferroceniumtetrakis(pentafluorophenyl)aluminate. Triphenylcarbeniumtetrakis(pentafluorophenyl)borate, and N,N-Dimethylaniliniumtetrakis(pentafluorophenyl)borate.

Organic aluminum compounds used as compound c) are those of formula $H_jAlU_{3-j}$ or $H_jAl_2U_{6-j}$ described above.

The catalyst system of the present invention can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent, such as hydrocarbon selected from toluene, hexane, pentane and propane and at a temperature ranging from 0° C. to 100° C., more from 30° C. to 60° C.

A particularly suitable process for supporting the catalyst system is described in WO01/44319, wherein the process comprises the steps of:
(a) preparing a catalyst solution comprising a soluble catalyst component;
(b) introducing into a contacting vessel:
  (i) a porous support material in particle form, and
  (ii) a volume of the catalyst solution not greater than the total pore volume of the porous support material introduced;
(c) discharging the material resulting from step (b) from the contacting vessel and suspending it in an inert gas flow, under such conditions that the solvent evaporates; and
(d) reintroducing at least part of the material resulting from step (c) into the contacting vessel together with another volume of the catalyst solution not greater than the total pore volume of the reintroduced material.

A suitable class of supports comprises porous organic supports functionalized with groups having active hydrogen atoms. Particularly suitable are those in which the organic support is a partially crosslinked styrene polymer. Supports of this type are described in EP 633 272.

Another class of inert supports particularly suitable for use according to the invention is that of polyolefin porous prepolymers, particularly polyethylene.

A further suitable class of inert supports for use according to the invention is that of porous magnesium halides, such as those described in WO 95/32995.

The process for the polymerization of olefins according to the invention can be carried out in the liquid phase, in the presence or absence of an inert hydrocarbon solvent, or in the gas phase. The hydrocarbon solvent can either be aromatic, such as toluene, or aliphatic, such as propane, hexane, heptane, isobutane or cyclohexane.

The polymerization temperature is generally comprised between 0° C. and +100° C. and, particularly, between 50° C. and +90° C. The polymerization pressure is generally comprised between 0.5 and 100 bar.

The components of the catalyst system can be brought into contact with each other before the polymerization. The pre-contact concentrations are generally between 0.1 and $10^{-8}$ mol/l for the metallocene component a), while they are generally between 2 and $10^{-8}$ mol/l for the component b). The pre-contact is generally effected in the presence of a hydrocarbon solvent and, if appropriate, of small quantities of monomer. In the pre-contact it is also possible to use a non-polymerizable olefin such as isobutene, 2-butene and the like.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds of formula (I) a polymer endowed with a broad melting is produced.

In the copolymers obtainable by the process of the invention, the content of ethylene derived units is between 99.9% by weight and 50% by weight; preferably is it between 99% by weight and 70% by weight; and more preferably it is between 95% by weight and 80% by weight.

The content of alpha-olefins derived units is between 0.1% by weight and 50% by weight; preferably is it between 1% by weight and 30% by weight; and more preferably it is between 5% by weight and 20% by weight.

Non-limiting examples of alpha-olefins of formula $CH_2$=CHR which can be used as alpha-olefins in the process of the invention are 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred comonomers are 1-hexene and 1-octene.

With the process of the present invention it is possible to obtain copolymers having a high molecular weight (I.V.) that makes the process object of the present invention fit for an industrial use.

The following examples are given for illustrative purpose and do not intend to limit the invention.

EXAMPLES

Analytical Methods

The intrinsic viscosity (I.V.) was measured in tetrahydronaphtalene (THN) at 135° C.

The melting points of the polymers ($T_m$) were measured by Differential Scanning Calorimetry (D.S.C.) on Perkin Elmer DSC-7 instrument, according to the standard method. A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to 0° C. with a scanning speed corresponding to 20° C./minute, the peak temperature was taken as crystallization temperature ($T_c$). After standing 5 minutes at 0° C., the sample was heated for the second time at 200° C. with a scanning speed corresponding to 20° C./min. In this second heating run, the peak temperature was taken as the melting temperature (T$_m$) and the area as global melting enthalpy (ΔH$_f$).

The molecular weight distribution was determined on a WATERS 150 C using the following chromatographic conditions:

| | |
|---|---|
| Columns: | 3x SHODEX AT 806 MS; 1x SHODEX UT 807; 1x SHODEX AT-G; |
| Solvent: | 1,2,4 trichlorobenzene (+0.025% 2,6-Di-tert.Butyl-4-Methyl-Phenol); |
| Flow rate: | 0.6-1 ml/min; |
| Temperature: | 135° C.; |
| Detector: | Infrared at λ ≅ 3.5 μm; |
| Calibration: | Universal Calibration with PS-Standards. |

$^{13}$C-NMR spectra were acquired on a DPX-400 spectrometer operating at 100.61 MHz in the Fourier transform mode at 120° C.

Preparation of Catalyst Components

Metallocene Compounds

Dimethylsilyl{(1-indenyl)-7-(2,5-dimethyl-cyclopenta[1,2-b:4,3-b']-dithiophene)}zirconium dichloride C-1 was prepared according to example 10 of WO01/47939;

Dimethylsilyl{(2-methyl-1-indenyl)-7-(2,5-dimethyl-cyclopenta[1,2-b:4,3-b']-dithiophene)}zirconium dichloride C-2 was prepared according to example 11 of WO01/47939;

Dimethylsilyl{(2-methylcyclopenta[a]naphthalene)-7-(2,5-dimethylcyclopenta[1,2-b:4,3-b']-dithiophene)}zirconium dichloride C-3 was prepared according to example 33 of WO01/47939.

Polyethylene Supports

The ethylene polymers used as supports were obtained from a Ziegler-Natta catalyst system, prepared according to the process described in WO 00/78820.

Support A

The polymerization was carried out in liquid propane at 30° C. at an ethylene partial pressure of 1.5 bar. Since once discharged the prepolymer resulted still active, a following treatment was necessary to deactivate the titanium catalytic system. A sample of 650 g of the obtained polymer was steamed in a fluidized bed reactor (0.1 kg steam/kg polymer, 110° C. for 30 minutes) and then dried in the same reactor, under hot nitrogen flow at 125° C. for several hours. The polymer has an intrinsic viscosity of 10.2 dL/g, average pore size of 386 μm, porosity of 1.27 mL/g (excluding macropores), average pore size of 1.1 μm and surface area of 7.7 m$^2$/g.

Preparation of the Catalyst System

Catalysts 1-3

The catalytic solution was prepared by adding, under inert conditions, the metallocene compound and MAO as indicated in table 1. The solution was stirred at room temperature for 15 minutes. Separately, the amount described in table 1 of the porous polyethylene prepolymer obtained as described above, was loaded in the equipment described in WO 01/44319. The jacket temperature of column 1 was set to 40° C. and that of column 2 to 110° C. The agitator of column 1 was activated and recirculation of the solid in the loop was initiated opening the nitrogen flow trough column 2. The catalytic solution was dosed to the support in 1.5 hours. At the end of the addition, the supported catalyst was maintained in recirculation for 15 minutes to eliminate the last traces of solvent. The composition of the obtained catalyst is described in table 1.

TABLE 1

| | | MAO ml | PE | catalyst composition | | |
|---|---|---|---|---|---|---|
| Cat | Metal (g) | (10% toluene sol) | g | Al % w | Zr ppm | Al/Zr |
| 1 | C-2 (0.22) | 110 | 46 | 6.55 | 660 | 334 |
| 2 | C-1 (0.4) | 105 | 35 | 6.70 | 790 | 284 |
| 3 | C-3 (0.97) | 105 | 35 | 6.65 | 2000 | 112 |

Catalyst 4

0.475 mmol of the metallocene compound C-2 were dissolved in 12.4 ml MAO (30% in toluene) and stirred for 1 h at room temperature. The solution was then dropped onto 9.5 g silica (ES70X, calcinated at 600° C., 6 h) and stirred for 1 h. The mixture was dried under vacuum at room temperature. The yield was 13.1 g of a free flowing yellow powder. The obtained catalyst had the following characteristics: zirconium content 50 mol/g SiO$_2$; Al/Zr 120/1

Catalyst 5

Catalyst 5 was obtained according to the same procedure used for catalyst 4, with the exception that metallocene compound C-3 was used.

Polymerization Examples 1-3

A 4 L autoclave, equipped with a blade turbine magnetic stirrer, pressure indicator, temperature indicator, system for loading the catalyst, feed line for monomer equipped with a thermal-mass flowmeter for the measure of the ethylene uptake and a thermosetting jacket, was used. At room temperature 2.5 mmol of TIBA (100 g/L hexane solution) as scavenger and 50 g of 1-hexene were loaded, followed by 1.6 L of propane; then the reactor was pressurized with 5 bar of ethylene partial pressure. The polymerization was started by injecting the catalyst at 30° C. A prepolymerization step was carried out at 30° C. for 30 minutes, then the temperature was raised up to 75° C. and the ethylene partial pressure was increased to 10 bar. These conditions were maintained by continuously feeding ethylene for 1 hour. Polymerization was stopped by venting and cooling the autoclave. The characterization of the obtained polymers is reported in table 2.

TABLE 2

| Ex | Catalyst | yield Kg/g cat | Activity Kg/g Zr·h | I.V. dL/g | Hexene % wt | Tm(II) (° C.) | Density g/ml |
|---|---|---|---|---|---|---|---|
| 1* | 1 | 1.0 | 127 | 3.72 | 9.4 (NMR) | 115.5 | n.a. |
| 2 | 2 | 1.2 | 101 | 3.25 | 9.4 (IR) | 116.6 | n.a. |
| 3 | 3 | 0.9 | 68 | 4.57 | 13.6 (IR) | 103.9 | 0.894 |

*1-hexene was added after the prepolymerization step
n.a. = not available

Polymerization Examples 4-5

In a 1 l reactor 80 g polyethylene were introduced as a seed bed. 10 mg isoprenyl aluminum (IPRA) as a 2 molar solution in heptane, 5 mg of the antistatic agent Costelan AS 100 and 11 ml heptane were added and stirred for 10 min. The amount of catalyst indicated in table 3 were added to the reactor, the reactor was closed and pressurized with 10 bar nitrogen. The reactor was heated to 70° C. and pressurized with 10 bar of an ethylene/hexene mixture to reach an overall pressure of 20 bar. After 1 h the reactor was depressurized and cooled to room temperature. The characterization of the obtained polymers is reported in table 3.

TABLE 3

| Ex | Catalyst | catalyst injected (mg) | total amount hexene used (ml) | yield g/g cat | I.V. dL/g |
|---|---|---|---|---|---|
| 4 | 4 | 218 | 15.4 | 353 | 3.1 |
| 5 | 5 | 113 | 9.0 | 389 | 4.7 |

The invention claimed is:

1. A process for producing a polymer of ethylene containing from 1.0 to 30% by weight of at least one derived units of alpha-olefins, the process comprising contacting, under polymerization conditions, ethylene and at least one alpha-olefins in the presence of a catalyst system obtained by contacting:

a) a metallocene compound of formula (I)

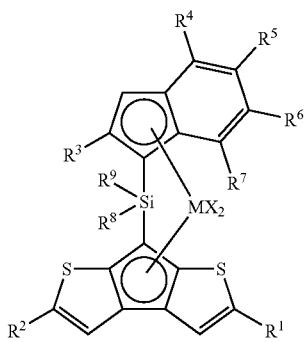

wherein:

M is zirconium, titanium or hafnium;

X, equal to or different from each other, are hydrogen atoms, halogen atoms, or a $R^{10}$, $OR^{10}$, $OR^{11}O$, $OSO_2CF_3$, $OCOR^{10}$, $SR^{10}$, $NR^{10}_2$, $PR^{10}_2$ group, wherein $R^{10}$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radicals, optionally containing heteroatoms belonging to groups 13-17 of the Periodic Table of the Elements; or two X can optionally form a substituted or unsubstituted butadienyl radical, wherein $R^{11}$ is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

$R^8$ and $R^9$, equal to or different from each other, are hydrogen atoms, halogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; two adjacent $R^8$ and $R^9$ groups can optionally form a saturated or unsaturated 5 or 6 membered ring, said ring can bear alkyl substituents; $R^1$, $R^2$, and $R^3$, equal to or different from each other, are $C_1$-$C_{10}$ alkyl radicals; $R^4$ and $R^5$ form a condensed aromatic 6 membered ring; $R^6$ is a hydrogen atom; and $R^7$ is a hydrogen atom or a methyl radical;

b) an alumoxane or a compound that forms an alkyl metallocene cation; and c) an organo aluminum compound, wherein the alpha-olefins are selected from 1-butene, 1-hexene, or 1-octene.

2. The process according to claims 1 wherein X is a hydrogen atom, a halogen atom, or a $R^{10}$ group, wherein $R^{10}$ is a linear or branched, $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radicals, optionally containing heteroatoms belonging to groups 13-17 of the Periodic Table of the Elements.

3. The process according to claim 1 wherein $R^8$ and $R^9$ are $C_1$-$C_{10}$ alkyl or $C_6$-$C_{20}$ aryl radicals.

4. The process according to claim 1 wherein the catalyst system is supported on an inert carrier.

5. The process according to claim 1 wherein the polymerization is carried out in the gas phase.

6. The process of claim 1 wherein the alpha-olefin is 1-butene.

7. The process of claim 1 wherein the alpha-olefin is 1-hexene.

8. The process of claim 1 wherein the alpha-olefin is 1-octene.

9. The process of claim 1 wherein the metallocene compound of formula (I) is dimethylsilyl{(2-methylcyclopenta[a]naphthalene)-7-(2,5-dimethylcyclopenta[1,2-b:4,3-b']-dithiophene)}zirconium dichloride.

10. The process of claim 9 wherein the alpha-olefin is 1-butene.

11. The process of claim 9 wherein the alpha-olefin is 1-hexene.

12. The process of claim 9 wherein the alpha-olefin is 1-octene.

* * * * *